United States Patent [19]
Stern et al.

[11] Patent Number: 5,144,320
[45] Date of Patent: Sep. 1, 1992

[54] SWITCHABLE SCAN ANTENNA ARRAY

[75] Inventors: Richard A. Stern, Allenwood; Richard W. Babbitt, Fair Haven, both of N.J.

[73] Assignee: The United States of America as represented by the Secretary of the Army, Washington, D.C.

[21] Appl. No.: 833,259

[22] Filed: Feb. 10, 1992

[51] Int. Cl.$^5$ .................... G01S 3/24; H01Q 13/24
[52] U.S. Cl. ........................ 342/374; 343/700 MS
[58] Field of Search ............... 342/374; 343/700 MS

[56] References Cited

U.S. PATENT DOCUMENTS

| | | | |
|---|---|---|---|
| 4,053,895 | 10/1977 | Malagisi | 343/700 MS |
| 4,521,781 | 6/1985 | Campi et al. | 343/700 MS |
| 4,754,237 | 6/1988 | Stern et al. | 333/1.1 |
| 4,839,659 | 6/1989 | Stern et al. | 343/700 MS |
| 4,933,680 | 6/1990 | Shapiro et al. | 343/700 MS |

OTHER PUBLICATIONS

Richard A. Stern and Richard W. Babbitt, "A MM-Wave Homogeneous Ferrite Phase Scan Antenna", *Microwave Journal*, Apr. 1987, pp. 101-108.

J. Borowick, W. Bayha, R. A. Stern, R. W. Babbitt, "Inertialess Scan Antenna Techniques for Millimeter Waves" *9th DARPA/Tri-MMWave Conference Record*, 1981.

M. Collier, "Microstrip Antenna Array for 12 GHz TV", *Microwave Journal*, vol. 20, No. 9, pp. 67-71.

*Primary Examiner*—Gilberto Barrón, Jr.
*Attorney, Agent, or Firm*—Michael Zelenka; William H. Anderson

[57] ABSTRACT

An antenna array includes several antenna elements, each having a microstrip transmission line which includes a strip conductor and a ground plane conductor separated by a dielectric substrate; an antenna portion of the substrate being adapted to enable energy within the substrate to radiate away from the microstrip transmission line. The substrate may have greater capacitance at the antenna portion than other portions of the substrate. The antenna portion is adapted to permit RF energy to the microstrip transmission line to be directionally radiated away from the microstrip transmission line at the antenna portion, the direction of radiation being a function of the frequency of the supplied energy and the antenna slot separation. The individual antenna elements are connected, preferably in pairs, to switching elements, preferably microstrip-type circulators, providing a switchable transmission path from an RF input to a selected antenna element. Each antenna element preferably provides a different radiated beam direction in response to a given input frequency. A desired beam direction can be selected by selecting a corresponding antenna element by means of the switching elements. Thus, by sequentially switching from one antenna to the next, electronic beam scanning can be accomplished without changing the frequency of the RF input.

9 Claims, 2 Drawing Sheets

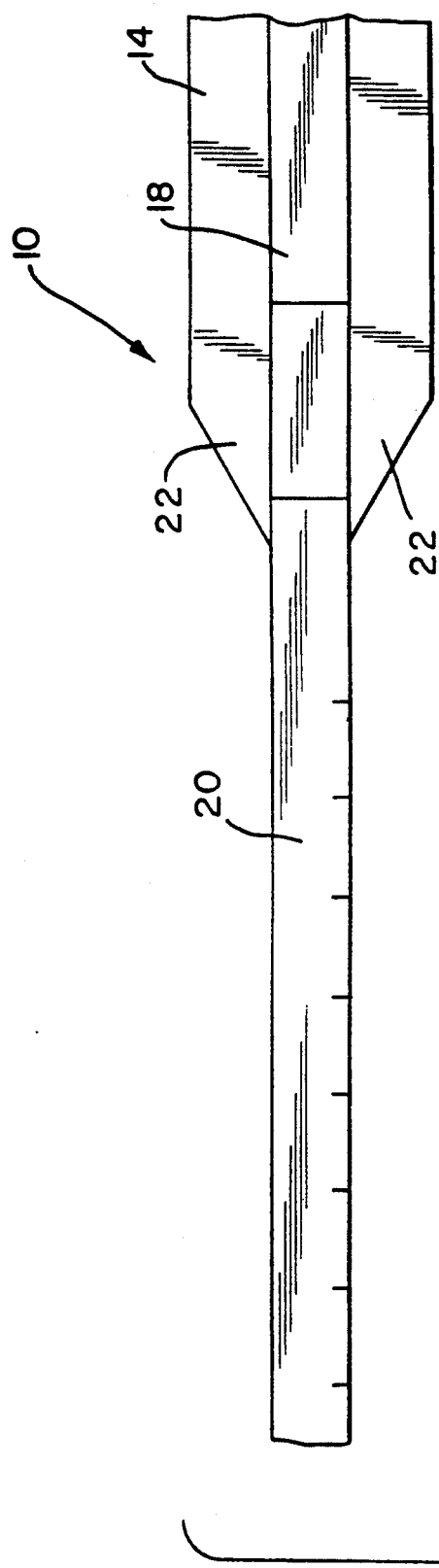
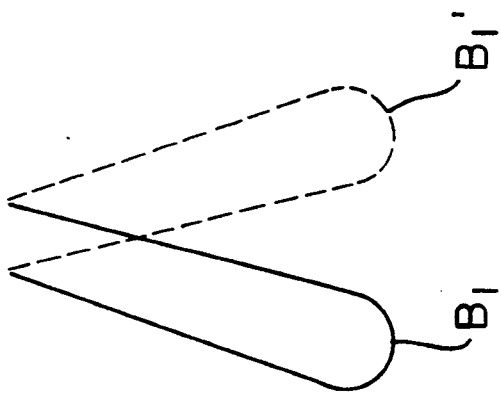
FIG. 2

SWITCHABLE SCAN ANTENNA ARRAY

STATEMENT OF GOVERNMENT INTEREST

The invention described herein may be manufactured, used, and licensed by or for the United States Government for governmental purposes without the payment to the inventors of any royalty.

CROSS-REFERENCE TO RELATED APPLICATION

This application is related to Ser. No. 07/832,837, filed on the same date as this application by the same inventors, and titled MICROSTRIP FREQUENCY-SCAN ANTENNA, the disclosures of which are incorporated by reference herein.

BACKGROUND OF THE INVENTION

The invention relates generally to a frequency-scan antenna array for the millimeter-wave region, and more particularly to an array of microstrip-type antennas which are switchable, for example, by means of electronically switchable ferrite Y-junction microstrip circulators.

A further aspect of the invention relates to an array of frequency-scan antennas in which each antenna has a ramped-microstrip construction.

Frequency-scan antennas are employed to provide inertialess electronic scan capability in the millimeter-wave region, particularly for radar systems. The inertialess scan feature is particularly important for surveillance, obstacle-avoidance and target-acquisition radars.

Antennas and antenna arrays of background interest are described in Stern et al., A MM-Wave Homogeneous Ferrite Phase Scan Antenna, Microwave Journal, Vol. 30, No. 4, pp. 101-108 (April 1987); Borowick et al., Inertialess Scan Antenna Techniques for Millimeter Waves, 9th DARPA/Tri-Service MMWave Conference Record (1981); and Collier, Microstrip Antenna Array for 12 GHz TV, Microwave Journal, Vol. 20, No. 9, pp. 67-71.

See also Stern et al., U.S. Pat. No 4,754,237 issued Jun. 28, 1988, titled Switchable Millimeter Wave Microstrip Circulator.

The contents of all noted prior art materials are incorporated by reference herein.

SUMMARY OF THE INVENTION

Despite the advantages of the known systems, there remains a continuing need for a planar design for an electronic-scan antenna which is simple, efficient and cost-effective.

The present invention satisfies this need by providing a scannable antenna array which comprises a plurality of antenna elements each having a microstrip-type transmission-line structure, mountable on a single microstrip substrate, offering the advantages of a small planar footprint, simple construction, light weight, and low loss. The individual antenna elements have different frequency response characteristics and accordingly direct radiating beams in different directions in response to input RF energy having a single given frequency. Each antenna element may be one of the antenna structures disclosed in copending Ser. No. 07/832,837, filed on the same date as this application by the same inventors, and titled MICROSTRIP FREQUENCY-SCAN ANTENNA. Other types of antenna element may be used as well.

The respective antenna elements are switchable, whereby the beam direction of the overall array can be scanned by means of the switching devices without changing the frequency of the supplied RF energy. The microstrip circulator disclosed in U.S. Pa. No. 4,754,237 may be employed as the switching device. Other types of circulator or switching device may be used as well.

According to a particularly advantageous embodiment of the invention, each antenna element in the array comprises a microstrip transmission line which includes a strip conductor and a ground plane conductor separated by a dielectric substrate; an antenna portion of the substrate being adapted to enable RF energy within the substrate to radiate away from the microstrip transmission line. The antenna portion is adapted to permit RF energy supplied to the microstrip transmission line to be directionally radiated away from the microstrip transmission line at the antenna portion, the direction of radiation being a function of the frequency of the supplied energy. Advantageously, the substrate has greater capacitance at the antenna portion than at other portions of the substrate.

The individual antenna elements are connected, preferably in pairs, to switching elements, preferably microstrip-type circulators, providing a switchable transmission path from an RF input to a selected antenna element. Each antenna element preferably provides a different radiated beam direction in response to a given input frequency. Thus, by selecting a desired antenna element by means of the switching elements, a corresponding desired beam direction can be selected.

Other features and advantages of the present invention will become apparent from the following description of the invention which refers to the accompanying drawings.

BRIEF DESCRIPTION OF THE DRAWINGS

FIG. 2 is a plan view of the antenna of FIG. 1, schematically showing its radiation pattern.

FIG. 3 is a schematic diagram of an antenna array employing a plurality of the antenna elements of FIG. 1, which are interconnected by a plurality of microstrip circulators, such as those disclosed in U.S. Pat. No. 4,754,237.

DESCRIPTION OF A PREFERRED EMBODIMENT

Figure 1:
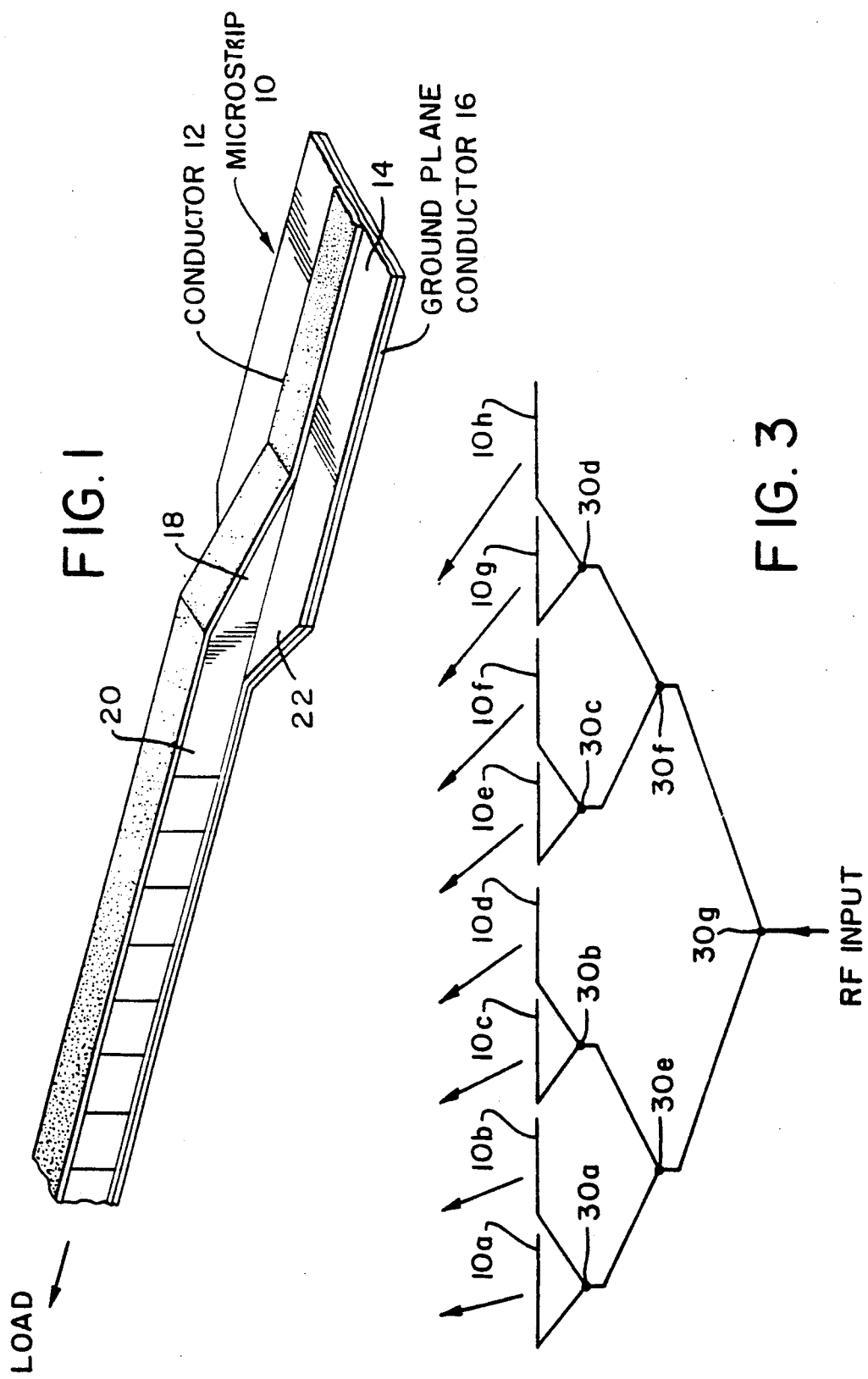
FIG. 1 is a simplified perspective view of an antenna according to copending Ser. No. 07/832,837, which may be employed as the individual antenna elements according to a preferred embodiment of the invention.

FIG. 1 is a simplified perspective view of an antenna element. A basic microstrip structure 10 is formed by a conductor 12, a dielectric substrate 14 and a ground plane conductor 16. The dielectric substrate 14 is typically about 0.010-inch (0.254-mm) thick Duroid TM, which is a composition of Teflon TM and fiberglass.

At a ramp portion 18 the thickness of the substrate is increased to about 0.070-inch (1.778-mm) to form a ramp up to a dielectric platform 20 about 0.070-inch thick. The conductor 12 runs up the ramp portion 18 and continues to run across the platform 20.

Formed on one side of the platform 20 is a series of periodic slots. According to one example of the invention, for operation at about 35 Ghz, the slots are about 0.140-inch (3.556-mm) apart and each slot is about 0.008-inch 0.2032-mm) wide and, 0.008-inch deep. The spacing is a function of the wavelength and the dielectric constant.

The RF signal injected into the microstrip line enters into the thicker high-dielectric-constant platform section with low transition and transmission loss. The top microstrip conductor and bottom ground plane conductor, together with the high-dielectric-constant platform section, confine the energy to be radiated out of the side of the antenna. As the signal travels through the antenna section and experiences a side wall slot, a portion of the energy is radiated out of the slot, the slot being a discontinuity for the propagating wave. This occurs for each successive slot, each radiating a portion of the incident power. The periodic nature of the energy radiating from the slots results in the formation of an antenna beam pattern. The direction of radiation is determined as a function of the slot spacing and other characteristics. Thus, the direction of radiation for a given RF input frequency can be adjusted as a function of slot spacing. Any residual RF energy traveling down the length of the antenna beyond the slotted section is dumped into an absorbing load.

By changing the frequency of the input RF energy, the position of the radiating beam can be shifted as shown in the top view of FIG. 2, in which the solid line $B_1$ shows the radiation pattern at one frequency and the dotted line $B_1'$, shows the radiation pattern at another frequency.

Adjacent approximately the full length of the platform 20, the substrate has approximately the same width as the platform 20. Near the ramp portion 18 the substrate has tapered portions 22 on each side where the substrate widens, so that away from the platform, the substrate extends away from the microstrip by approximately 1 to 2 times the width of the microstrip. These widened portions of the substrate provide a widened ground plane 16, which helps to contain the electric field in the substrate between the conductor 12 and the ground plane 16.

On the other hand, the platform 20 is made of a low-loss microwave-type dielectric material, for example MgTi. Its dielectric constant is about 12, while that of the Duroid substrate is about 2. With the high dielectric constant of the platform 20, the extended ground plane is not necessary to contain the field and furthermore would distort the radiation pattern of the antenna if it were present.

The precise location of the tapered portions 22 is not believed to be critical. The ground plane should start to widen between the last slot and the top of the ramp, and preferably near the top of the ramp.

FIG. 3 shows schematically an array of eight antenna elements 10a-10h of the type shown in FIGS. 1 and 2. Respective pairs of antenna elements are switchably connected to respective microstrip circulators 30a-30d by suitable microstrip transmission lines. For example, elements 10a and 10b are both connected to a circulator 30a and elements 10c and 10d are both connected to a circulator 30b. The method of operation of the circulators is disclosed in U.S. Pat. No. 4,754,237 which is incorporated by reference. In turn, circulators 30a and 30b are fed by a circulator 30e, and circulators 30c and 30d are fed by a circulator 30f. Finally, circulators 30e and 30f are fed by a circulator 30g which is connected to an RF input. In all, seven circulators 30a-30g are connected in a tree arrangement for providing a switchable signal path from the RF input to any one of the eight antenna elements in this embodiment of the invention.

Each of the electronically switchable ferrite Y-junction microstrip circulators acts as an SPDT switch to route the input signal selectively to any one of the eight antennas. Each of the antennas is designed to generate a radiating beam in a different direction for a given input frequency, as shown by the arrows in FIG. 3. Thus, by sequentially switching from one antenna to the next, electronic beam scanning can be accomplished without changing the frequency of the RF input.

Advantageously, the antenna elements of FIGS. 1 and 2 and the circulators of FIG. 3 can be formed on the same basic microstrip substrate, thereby forming an antenna array which is compact, economical to construct, and efficient in operation.

Although the present invention has been described in relation to a particular embodiment thereof, variations and modifications and other uses will become apparent to those skilled in the art. It is preferred, therefore, that the present invention be limited not by the specific disclosure herein, but only by the appended claims.

What is claimed is:

1. An antenna array comprising:
a plurality of antenna elements, each antenna element being separated from one another at a predetermined distance and each antenna element comprising a microstrip transmission line which includes a strip conductor and a ground plane conductor separated by a dielectric substrate, the substrate having an antenna portion formed therein having radiating means permitting RF energy supplied to said microstrip transmission line to be directionally radiated away from said microstrip transmission line at said antenna portion, the direction of radiation being a function of the frequency of the RF energy supplied to said microstrip transmission line and the predetermined distance of separation of the antenna elements;
switching means for switchably supplying input RF energy to a selected one of said antenna elements; and
RF energy to said switching means;
wherein said antenna portion is defined by a platform between said strip conductor and said ground plane conductor at said antenna portion which is substantially thicker than at other portions of said substrate.

2. An antenna as in claim 1, wherein said radiating means comprises lateral slots formed in said platform permitting lateral radiation therefrom of said supplied energy.

3. An antenna as in claim 2, wherein said lateral slots are spaced with substantially equal spacing, whereby the direction of radiation is a function of the frequency of the supplied energy.

4. An antenna as in claim 1, wherein the substrate has greater capacitance at said antenna portion than at said other portions.

5. An antenna as in claim 1, wherein the substrate has greater dielectric constant at said antenna portion than at said other portions.

6. An antenna array as in claim 1, wherein at least two said antenna elements provide different respective directions of radiation in response to a given input RF frequency, whereby said switching means scans said antenna array by selecting said at least two antenna elements in sequence.

7. An antenna array as in claim 1, wherein said switching means comprises a microstrip circulator.

8. An antenna array as in claim 7, wherein at least two respective pairs of antenna elements are interconnected by respective microstrip circulators.

9. An antenna array as in claim 8, wherein all said antenna elements and microstrip circulators have a common substrate.

* * * * *